United States Patent
Wang et al.

(10) Patent No.: US 12,063,434 B2
(45) Date of Patent: Aug. 13, 2024

(54) IMAGING SYSTEMS AND METHODS

(71) Applicant: ZHEJIANG DAHUA TECHNOLOGY CO., LTD., Zhejiang (CN)

(72) Inventors: Jianmiao Wang, Hangzhou (CN); Xiaochen Zhan, Hangzhou (CN); Chaojie Zhao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 177 days.

(21) Appl. No.: 17/660,208

(22) Filed: Apr. 21, 2022

(65) Prior Publication Data
US 2022/0247926 A1  Aug. 4, 2022

Related U.S. Application Data

(63) Continuation of application No. PCT/CN2020/110797, filed on Aug. 24, 2020.

(30) Foreign Application Priority Data

Dec. 5, 2019 (CN) .......................... 201911236798.9

(51) Int. Cl.
*H04N 23/65* (2023.01)
*G06F 1/00* (2006.01)
(Continued)

(52) U.S. Cl.
CPC .......... *H04N 23/65* (2023.01); *H04N 23/634* (2023.01); *H04N 23/74* (2023.01)

(58) Field of Classification Search
CPC .... H04N 23/65; H04N 23/634; H04N 23/631; H04N 23/63; H04N 23/633;
(Continued)

(56) References Cited

U.S. PATENT DOCUMENTS 6,995,543 B2 * 2/2006 Nunomaki ............ H01M 10/48
320/132
8,913,179 B2  12/2014 Jannard
(Continued)

FOREIGN PATENT DOCUMENTS

CN  101903845 A  12/2010
CN  102822761 A  12/2012
(Continued)

OTHER PUBLICATIONS

International Search Report in PCT/CN2020/110797 mailed on Nov. 17. 2020, 5 pages.
(Continued)

*Primary Examiner* — Daquan Zhao
(74) *Attorney, Agent, or Firm* — METIS IP LLC

(57) ABSTRACT

The present disclosure relates to imaging systems and methods. An imaging method may include determining a first remaining power based on a maximum power of a camera and a working power of the camera; determining whether an operation condition of a first load is satisfied based on the first remaining power; and in response to a determination that the operation condition of the first load is satisfied, enabling the first load.

20 Claims, 10 Drawing Sheets

(51) Int. Cl.
  *G06F 1/28* (2006.01)
  *H04N 23/63* (2023.01)
  *H04N 23/74* (2023.01)
  *G06F 1/26* (2006.01)

(58) Field of Classification Search
  CPC .... H04N 23/651; H04N 23/74; G06F 1/1686; G06F 1/00; G06F 1/28; G06F 1/26; G06F 1/263; G06F 1/266; G06F 1/305; G06F 1/32; G06F 1/3203; G06F 1/3206; G06F 1/3234; G06F 1/325; G06F 1/3278; G06F 1/3287; G06F 1/3215; G06F 1/3296
  USPC .......... 348/208.16, 207.99, 333.13, 372, 730
  See application file for complete search history.

(56) References Cited

U.S. PATENT DOCUMENTS

| | | | | |
|---|---|---|---|---|
| 2003/0221134 | A1* | 11/2003 | Ebato | G06F 1/3203 |
| | | | | 713/300 |
| 2005/0013604 | A1* | 1/2005 | Ogawa | G01R 31/3646 |
| | | | | 396/279 |
| 2011/0115396 | A1 | 5/2011 | Horvath et al. | |
| 2011/0218694 | A1* | 9/2011 | Moriya | H01M 10/613 |
| | | | | 429/50 |
| 2012/0056596 | A1* | 3/2012 | Yamada | G01R 31/367 |
| | | | | 320/134 |
| 2016/0179164 | A1 | 6/2016 | Park et al. | |
| 2016/0227113 | A1 | 8/2016 | Horesh | |

FOREIGN PATENT DOCUMENTS

| | | |
|---|---|---|
| CN | 103944739 A | 7/2014 |
| CN | 104580924 A | 4/2015 |
| CN | 105578642 A | 5/2016 |
| CN | 106375705 A | 2/2017 |
| CN | 106487223 A | 3/2017 |
| CN | 106537348 A | 3/2017 |
| CN | 107370966 A | 11/2017 |
| CN | 108259734 A | 7/2018 |
| CN | 110958389 A | 4/2020 |
| JP | H05260658 A | 10/1993 |

OTHER PUBLICATIONS

Written Opinion in PCT/CN2020/110797 mailed on Nov. 17, 2020, 4 pages.
First Office Action in Chinese Application No. 201911236798.9 mailed on Dec. 25, 2020. 12 pages.
The Second Office Action in Chinese Application No. 201911236798.9 mailed on Jul. 22, 2021, 24 pages.
The Extended European Search Report in European Application No. 20897503.7 mailed on Oct. 26, 2022, 9 pages.

* cited by examiner

IMAGING SYSTEMS AND METHODS

CROSS-REFERENCE TO RELATED APPLICATIONS

This application is a Continuation of International Application No. PCT/CN2020/110797, filed on Aug. 24, 2020, which claims priority of Chinese Application No. 201911236798.9, filed on Dec. 5, 2019, the contents of which are incorporated herein by reference.

TECHNICAL FIELD

The present disclosure generally relates to imaging systems and methods, and more particularly, to systems and methods for enabling a load of a camera.

BACKGROUND

Cameras are widely used. Under some circumstances, such as using a long power line or a low-voltage power adapter, a voltage of a camera may decrease when a load is enabled. The camera may restart, which may affect using the camera by a user. Existing methods for preventing the camera from restarting usually determine whether to enable a load by comparing a voltage of the camera with a voltage threshold. However, the existing methods do not consider partial pressures of components inside the camera (e.g., an impedance of the power line, etc.). When enabling a load, the camera always still restart and cannot work stability. Thus, it is desirable to provide imaging systems and methods for preventing the camera from restarting.

SUMMARY

An aspect of the present disclosure introduces an imaging system. The imaging system may include at least one storage medium including a set of instructions, and at least one processor in communication with the storage medium. When executing the set of instructions, the at least one processor may perform the operations including: determining a first remaining power based on a maximum power of a camera and a working power of the camera; determining whether an operation condition of a first load is satisfied based on the first remaining power; and in response to a determination that the operation condition of the first load is satisfied, enabling the first load.

In some embodiments, the first load is a fill flash and the determining whether the operation condition of the first load is satisfied includes: obtaining a mapping relation between a duty ratio of the fill flash and a consumed power of the fill flash; determining a maximum duty ratio of the fill flash based on the mapping relation and the first remaining power; determining whether the maximum duty ratio of the fill flash exceeds a duty ratio threshold; and in response to a determination that the maximum duty ratio exceeds the duty ratio threshold, determining that the operation condition of the first load is satisfied.

In some embodiments, the enabling the first load includes: enabling the fill flash using the duty ratio threshold.

In some embodiments, the operations further include: determining an adjusting parameter based on a real-time voltage of the camera and a real-time duty ratio of the fill flash; and determining a target duty ratio of the fill flash based on the adjusting parameter.

In some embodiments, the determining the target duty ratio of the fill flash includes: determining whether the adjusting parameter satisfies an adjusting condition; and in response to a determination that the adjusting parameter satisfies the adjusting condition, determining a step length based on the maximum duty ratio of the fill flash and the real-time voltage of the camera.

In some embodiments, the operations further include: determining whether an operation condition of a second load is satisfied based on the first remaining power.

In some embodiments, the determining whether the operation condition of the second load is satisfied includes: determining a second remaining power based on the first remaining power and a current working power of the first load; determining whether the second remaining power exceeds a power threshold; and in response to a determination that the second remaining power exceeds the power threshold, enabling the second load.

In some embodiments, the operations further include: in response to a determination that the second remaining power is less than the power threshold, determining a third remaining power based on the first remaining power and a minimum working power of the first load; determining whether the third remaining power exceeds the power threshold; in response to a determination that the third remaining power exceeds the power threshold, enabling the first load using a minimum duty ratio of the first load; and enabling the second load.

In some embodiments, the operations further include: in response to a determination that the third remaining power is less than the power threshold, determining whether the first remaining power exceeds the power threshold; and in response to a determination that the first remaining power exceeds the power threshold, disabling the first load.

In some embodiments, the operations further include: in response to a determination that the first remaining power is less than the power threshold, disabling the second load and sending an alarm.

In some embodiments, the obtaining the mapping relation includes: determining a consumed power of the fill flash under each duty ratio of a plurality of duty ratios; and establishing the mapping relation based on the consumed power under each duty ratio of a plurality of duty ratios.

According to another aspect of the present disclosure, an imaging method is provided. The imaging method may include determining a first remaining power based on a maximum power of a camera and a working power of the camera; determining whether an operation condition of a first load is satisfied based on the first remaining power; and in response to a determination that the operation condition of the first load is satisfied, enabling the first load.

According to still another aspect of the present disclosure, a non-transitory computer-readable medium, comprising at least one set of instructions compatible is provided. When executed by at least one processor of an electrical device, the at least one set of instructions may direct the at least one processor to perform the following operations. The at least one processor may perform the operations including: determining a first remaining power based on a maximum power of a camera and a working power of the camera; determining whether an operation condition of a first load is satisfied based on the first remaining power; and in response to a determination that the operation condition of the first load is satisfied, enabling the first load.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
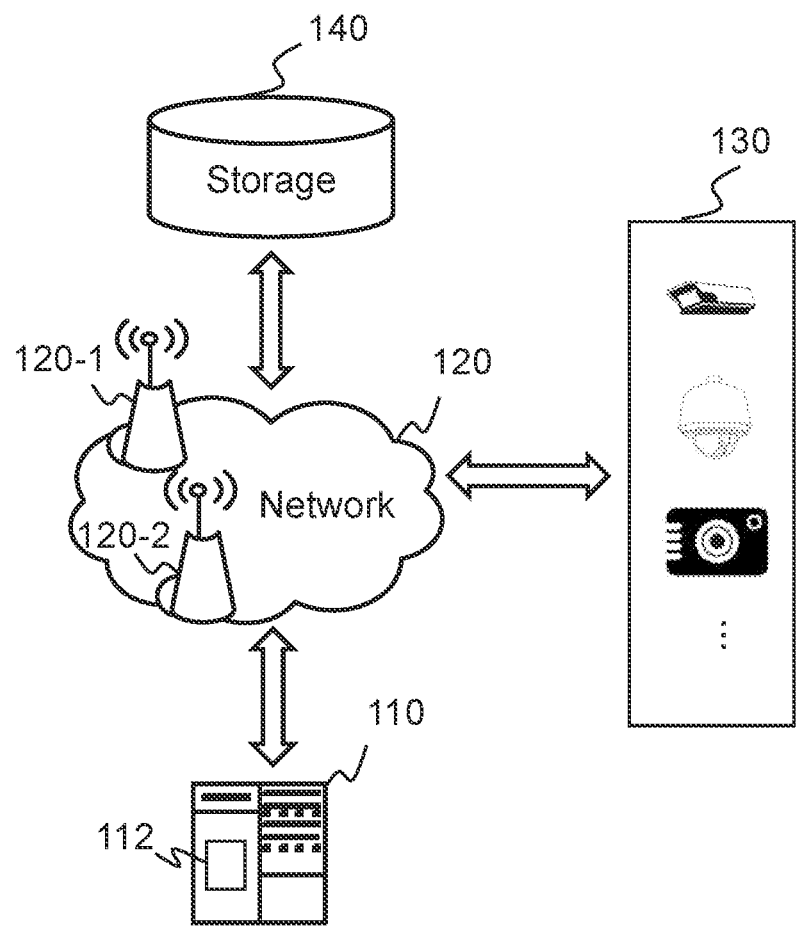
FIG. 1 is a schematic diagram illustrating an exemplary imaging system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to imaging systems and methods, especially for adaptively preventing a camera from restarting. To this end, the imaging systems and methods may adaptively determine whether to enable a load (e.g., a fill flash of the camera, etc.) by considering a supply voltage of a circuit in which the camera is, an impedance of a power line, a power of the load, etc. The imaging systems and methods may determine whether the camera restarts when enabling the load. Further, the imaging systems and methods may adjust parameters of the load (e.g., a luminance of the fill flash) to make the load function well under the current circumstance. In addition, the imaging systems and methods may determine whether there is a voltage leap to prevent the camera from restarting. In this way, the imaging systems and methods may adaptively prevent the camera from restarting, and the load of the camera may be adjusted in real-time and rapidly.

FIG. 1 is a schematic diagram of an exemplary imaging system 100 according to some embodiments of the present disclosure. The imaging system 100 may include a server 110, a network 120, a camera 130, and a storage 140.

The server 110 may be configured to process information and/or data relating to the camera 130. For example, the server 110 may determine whether an operation condition of a first load of the camera 130 is satisfied. As another example, the server 110 may determine a step length for adjusting the first load. As still another example, the server 110 may determine whether an operation condition of a second load of the camera 130 is satisfied. In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the camera 130, and/or the storage 140 via the network 120. As another example, the server 110 may connect the camera 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure. In some embodiments, the server 110 may be an encoder.

In some embodiments, the server 110 may include a processing engine 112. The processing engine 112 may process information and/or data relating to the camera 130. For example, the processing engine 112 may determine whether an operation condition of a first load of the camera 130 is satisfied. As another example, the processing engine 112 may determine a step length for adjusting the first load. As still another example, the processing engine 112 may determine whether an operation condition of a second load of the camera 130 is satisfied. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

The network 120 may facilitate the exchange of information and/or data. In some embodiments, one or more components of the imaging system 100 (e.g., the server 110, the camera 130, and the storage 140) may transmit information and/or data to other component(s) in the imaging system 100 via the network 120. For example, the server 110 may obtain information relating to a circuit in which the camera 130 is via the network 120. As another example, the server 110 may send instructions (e.g., enabling a load) to the camera 130 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the imaging system 100 may be connected to the network 120 to exchange data and/or information between them.

The camera 130 may be any electronic device that is capable of capturing images or videos. For example, the camera 130 may include an image sensor, a video recorder, or the like, or any combination thereof. In some embodiments, the camera 130 may include any suitable types of camera, such as a fixed camera, a fixed dome camera, a covert camera, a Pan-Tilt-Zoom (PTZ) camera, a thermal camera, or the like, or any combination thereof. In some embodiments, the camera 130 may further include at least one network port. The at least one network port may be configured to send information to and/or receive information from one or more components in the imaging system 100 (e.g., the server 110, the storage 140) via the network 120. In some embodiments, the camera 130 may be implemented on a computing device 200 having one or more components illustrated in FIG. 2, or a mobile device 300 having one or more components illustrated in FIG. 3 in the present disclosure. In some embodiments, the camera 130 may include a plurality of load for different functions. For example, the plurality of load may include a fill flash for providing light for the camera 130, a load for changing a focal length of the camera 130, a load for focusing of the camera 130, or the like, or any combination thereof.

The storage 140 may store data and/or instructions. For example, the storage 140 may store predetermined rules for determining whether an operation condition of a load of the camera 130 is satisfied. As another example, the storage 140 may store a mapping relation between a duty ratio of the load and a consumed power of the load. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the imaging system 100. For example, the storage 140 may be connected to the network 120 to communicate with one or more components of the imaging system 100 (e.g., the server 110, the camera 130) via the at least one network port. One or more components in the imaging system 100 may access the data or instructions stored in the storage 140 via the network 120. In some embodiments, the storage 140 may be directly connected to or communicate with one or more components in the imaging system 100 (e.g., the server 110, the camera 130). In some embodiments, the storage 140 may be part of the server 110.

Figure 2:
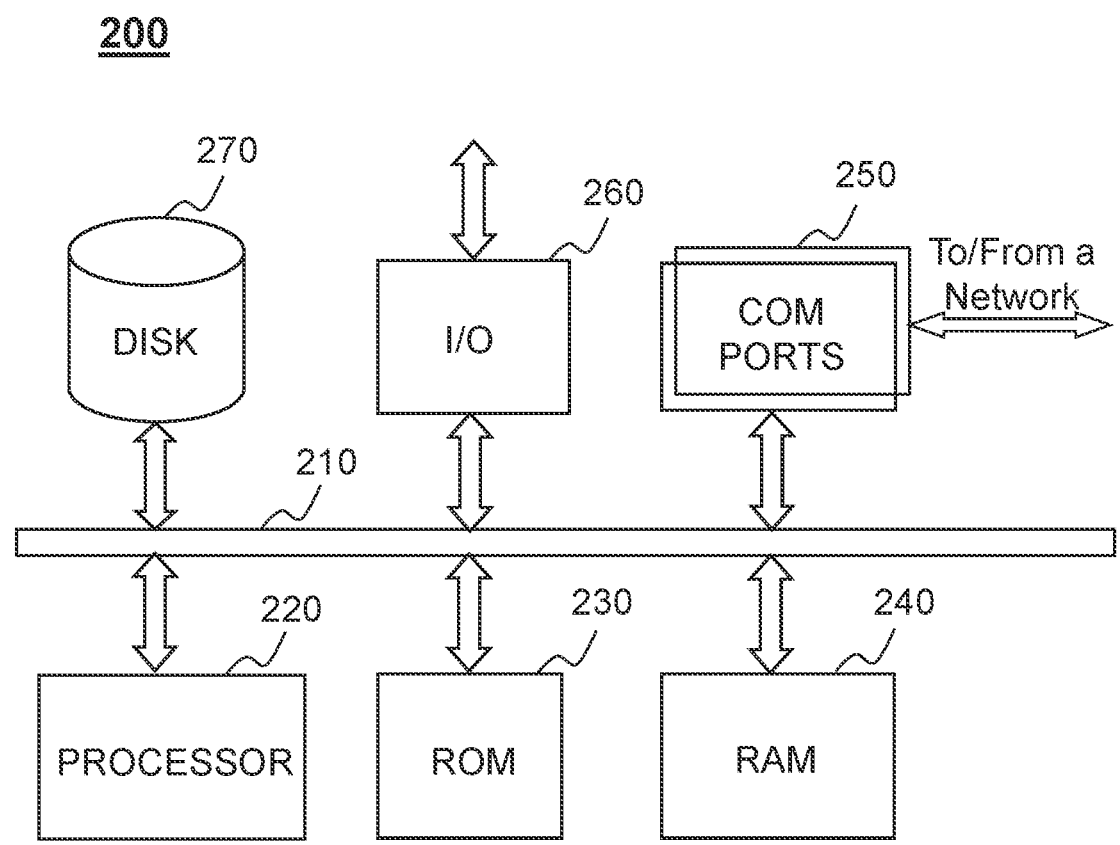
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the camera 130 may be implemented according to some embodiments of the present disclosure. For example, the processing engine 112 or an encoder may be implemented on the computing device 200 and configured to perform functions of the processing engine 112 disclosed in this disclosure.

The computing device 200 may be used to implement the imaging system 100 for the present disclosure. The computing device 200 may be used to implement any component of the imaging system 100 that performs one or more functions disclosed in the present disclosure. For example, the processing engine 112 may be implemented on the computing device 200, via its hardware, software program, firmware, or a combination thereof. Although only one such computer is shown, for convenience, the computer functions relating to the camera 130 as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the camera 130) in the imaging system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., whether to enable a load of the camera 130, an alarm) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The exemplary computing device may also include operating systems stored in the ROM 230, RAM 240, and/or other types of non-transitory storage medium to be executed by the processor 220. The program instructions may be compatible with the operating systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
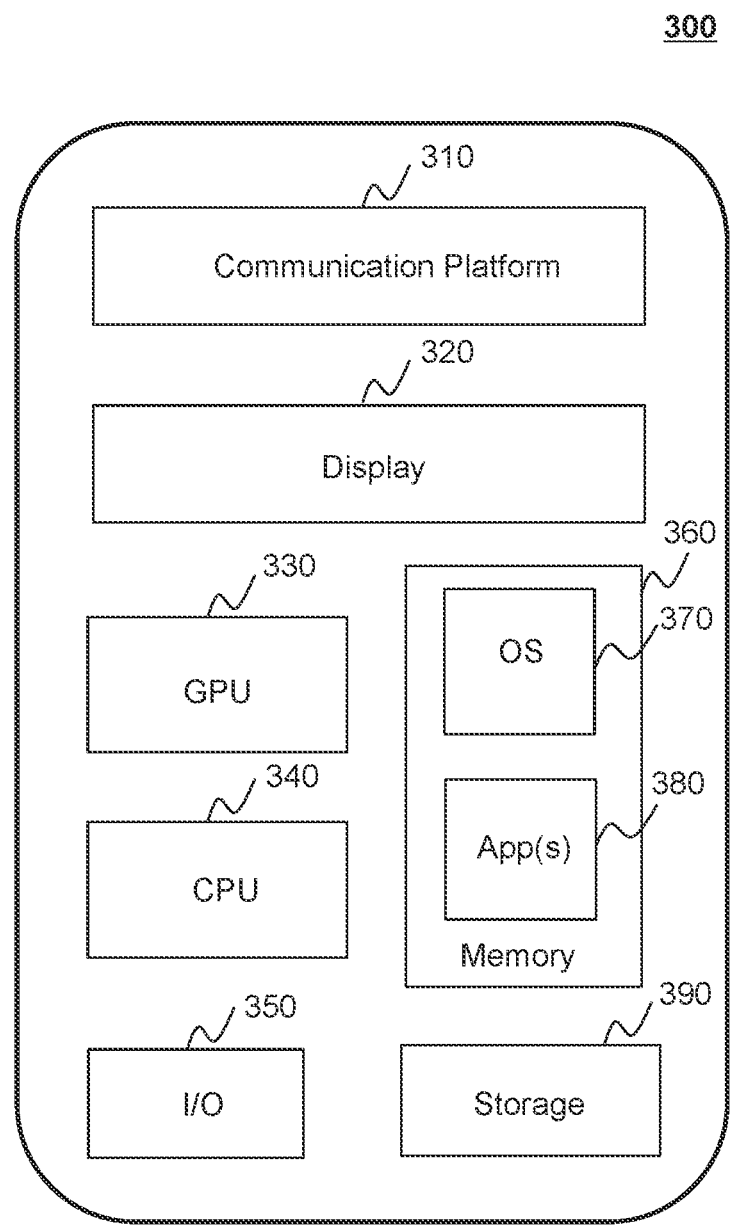
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the camera 130 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to the camera 130. User interactions with the information stream may be achieved via the I/O devices 350 and provided to the processing engine 112 and/or other components of the imaging system 100 via the network 120.

To implement various modules, units, and their functionalities described in the present disclosure, computer hardware platforms may be used as the hardware platform(s) for one or more of the elements described herein (e.g., the imaging system 100, and/or other components of the imaging system 100 described with respect to FIGS. 1-11). The hardware elements, operating systems and programming languages of such computers are conventional in nature, and it is presumed that those skilled in the art are adequately familiar therewith to adapt those technologies to select the best facial image of the target human face as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
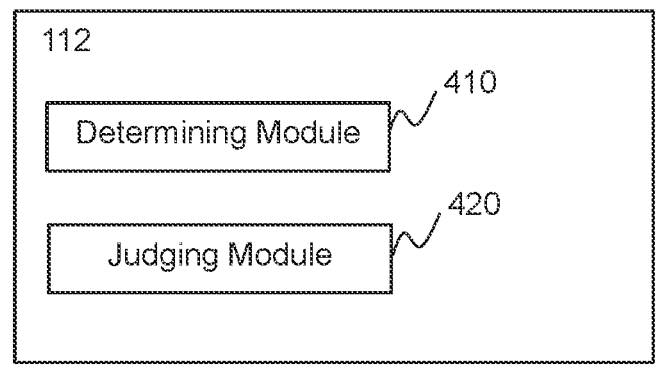
FIG. 4 is a block diagram illustrating an exemplary processing engine according to some embodiments of the present disclosure.

FIG. 4 is a block diagram illustrating an exemplary processing engine 112 according to some embodiments of the present disclosure. As shown in FIG. 4, the processing engine 112 may include a determining module 410 and a judging module 420.

The determining module 410 may be configured to determine a first remaining power. In some embodiments, the first remaining power may be a maximum power that other loads except for the camera 130 itself may achieve. For example, the determining module 410 may determine the first remaining power based on a maximum power of a camera 130 and a working power of the camera 130.

The judging module 420 may be configured to determine whether to enable a load of the camera 130. For example, the judging module 420 may determine whether an operation condition of a first load is satisfied. As another example, the judging module 420 may determine whether an operation condition of a second load is satisfied. As still another example, the judging module 420 may enable and/or disable the first load and/or the second load. As still another example, the judging module 420 may send an alarm.

Figure 5:
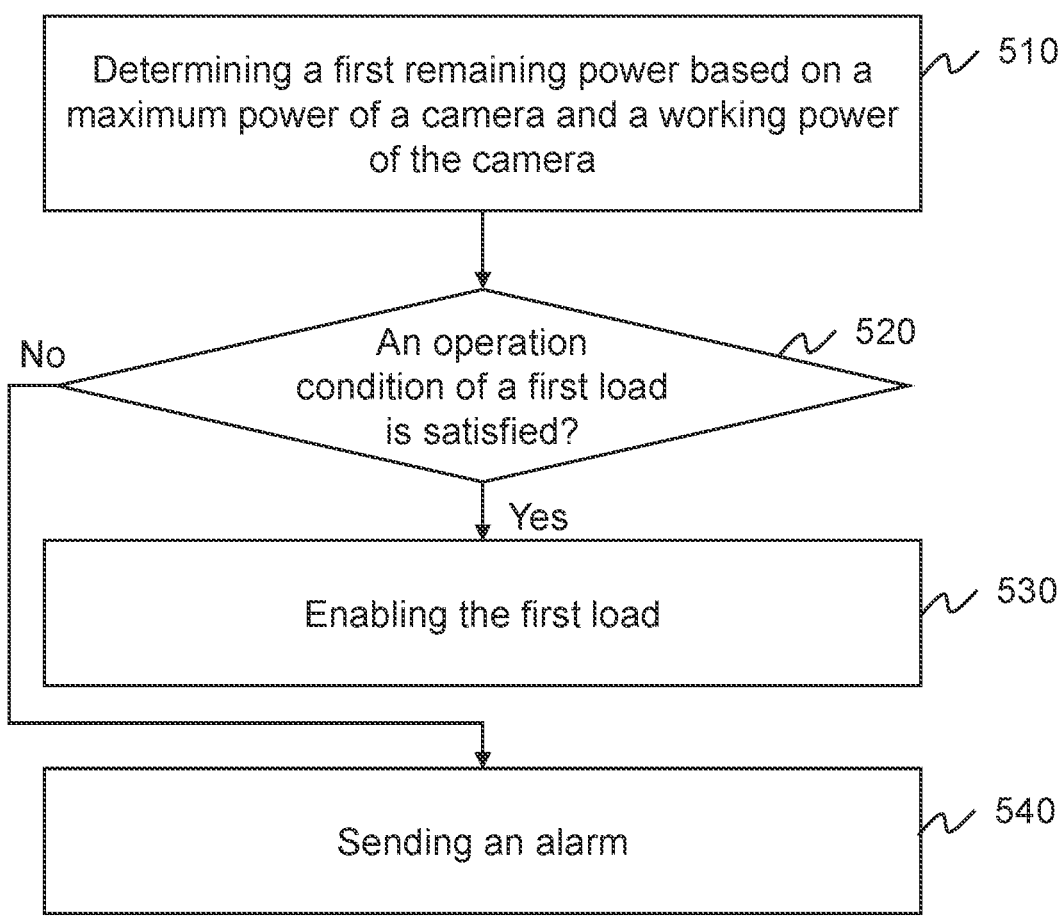
FIG. 5 is a flowchart illustrating an exemplary process for determining whether to enable a first load according to some embodiments of the present disclosure.

FIG. 5 is a flowchart illustrating an exemplary process 500 for determining whether to enable a first load according to some embodiments of the present disclosure. The process 500 may be executed by the imaging system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the determining module 410) may determine a first remaining power based on a maximum power of a camera 130 and a working power of the camera 130.

In some embodiments, the first remaining power may be a maximum power that other loads except for the camera 130 itself may achieve. For example, the first remaining power may be a maximum power that that a circuit in which the camera 130 is can support when only one function for capturing images or videos is enabled. In some embodiments, the maximum power of a camera 130 may be a maximum power that the camera 130 may output without restarting. In some embodiments, the working power of the camera 130 may be a minimum working power that the camera 130 consumes when only one function for capturing images or videos is enabled. In some embodiments, the processing engine 112 may determine the first remaining power by subtracting the maximum power by the working power of the camera 130. In some embodiments, the maximum power and the working power of the camera 130 may be determined based on a circuit of the camera 130 as shown in FIG. 6.

Figure 6:
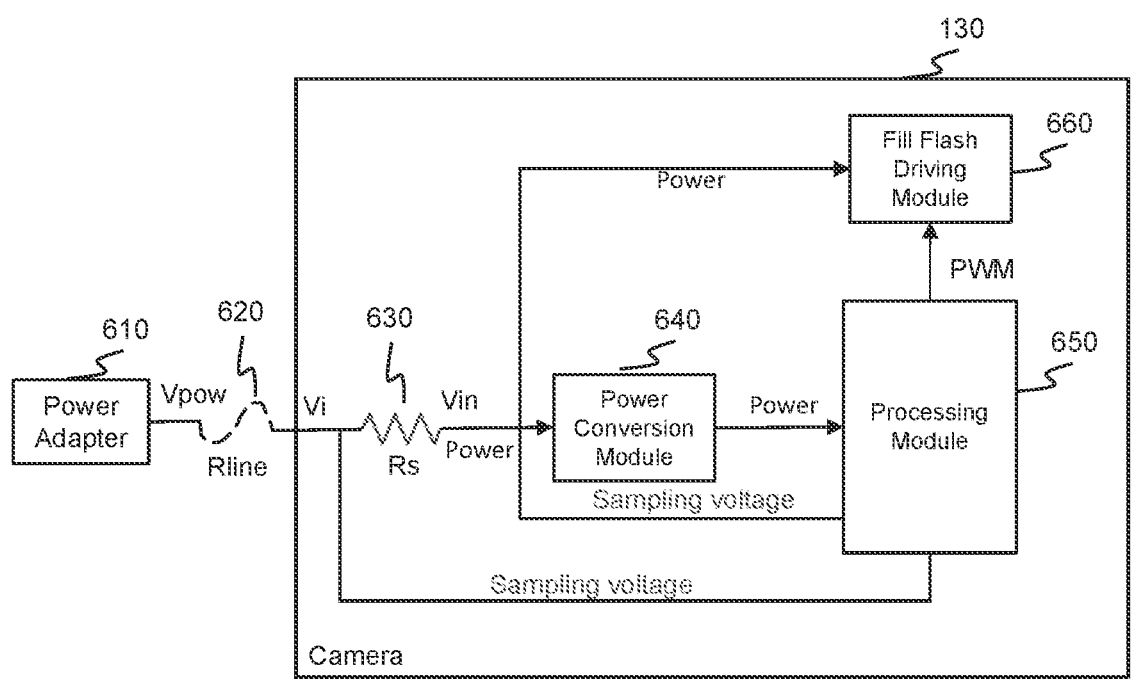
FIG. 6 is a schematic diagram illustrating an exemplary circuit of a camera according to some embodiments of the present disclosure.

FIG. 6 is a schematic diagram illustrating an exemplary circuit of the camera 130 according to some embodiments of the present disclosure. As shown in FIG. 6, a power adapter 610 may power the camera 130 via a power line 620. The camera 130 may include a sampling resistance 630, a power conversion module 640, a processing module 650, and a fill flash driving module 660.

As shown in FIG. 6, the sampling resistance 630 may connect with the power line 620 and an input end of the power conversion module 640 in series. The sampling resistance 630 may receive a voltage $V_i$ and output a voltage $V_{in}$ to power the power conversion module 640 and the fill flash driving module 660. A resistance value of the sampling resistance 630 may be $R_s$.

In some embodiments, the power conversion module 640 may be input the voltage $V_{in}$ and output a converted voltage to the processing module 650 by converting the voltage $V_{in}$ using a Direct Current Direct Current Converter (DCDC) and a Low Dropout Regulator (LDO) chip. In some embodiments, the voltage $V_{in}$ may be variable and a minimum value of the voltage $V_{in}$ may be $V_{Min}$. $V_{Min}$ may be a voltage protection point that supports the camera 130 to operate normally.

In some embodiments, an input end of the processing module 650 may connect to an output end of the power conversion module 640 to ensure programs inside the processing module 650 operates normally. Two sampling channels may connect to two ends of the sampling resistance 630 to sample voltages $V_i$ and $V_{in}$ at the two end of the sampling resistance 630, respectively. The power conversion module 640 may output a Pulse-Width Modulation (PWM) pin to the fill flash driving module 660. A current of the fill flash may be proportional to a duty ratio of a PWM signal.

In some embodiments, an input end of the fill flash driving module 660 may connect to the output voltage $V_{in}$ from the sampling resistance 630. The fill flash driving module 660 may receive PMW signals output from the processing module 650, and output driving current to a fill flash to lighten the fill flash.

In some embodiments, as shown in FIG. 6, the camera 130 may be powered and be an original state that only one function for capturing images or videos is enabled. The processing engine 112 may obtain two voltages $V_{i\_0}$ and $V_{in\_0}$ at two ends of the sampling resistance 630 under the original state, respectively. The resistance value $R_s$ of the sampling resistance 630 may be known. In some embodiments, the processing engine 112 may determine a current $I_0$ of the camera 130 according to Equation (1) and the working power $P_0$ of the camera 130 according to Equation (2):

$$I_0 = (V_{i\_0} - V_{in\_0})/R_s \tag{1}$$

$$P_0 = V_{i\_0} * I_0 \tag{2}$$

wherein $V_{i\_0}$ and $V_{in\_0}$ denotes voltage values at the two ends of the sampling resistance 630, respectively, and $R_s$ denotes the resistance value of the sampling resistance 630.

In some embodiments, the processing engine 112 may obtain two voltages $V_{i\_1}$ and $V_{in\_1}$ at two ends of the sampling resistance 630 when using a minimum PWM duty ratio $PMW_{Min}$ ($PWM_1$) to enable the fill flash, respectively. In some embodiments, the processing engine 112 may determine a current $I_1$ of the camera 130 and the working power $P_1$ of the camera 130 according to similar algorithms with Equations (1) and (2).

In some embodiments, the processing engine 112 may determine a voltage value $V_{pow}$ of the power adapter 610 and an impedance value $R_{line}$ of the power line 620 according to Equations (3) and (4):

$$\frac{(V_{pow} - V_{i\_0})}{R_{line}} = (V_{i\_0} - V_{in\_0})/R_s, \tag{3}$$

$$\frac{(V_{pow} - V_{i\_1})}{R_{line}} = (V_{i\_1} - V_{in\_1})/R_s. \tag{4}$$

In some embodiments, the processing engine 112 may determine a maximum current $I_{max}$ that the camera 130 can tolerate without restarting according to Equation (5), and the maximum power $P_{max}$ of the camera 130 according to Equation (6):

$$I_{max} = (V_{pow} - V_{min})/(R_{line} + Rs) \tag{5}$$

$$P_{max} = V_{Min} * I_{max} + I_{max} * I_{max} * Rs \tag{6}$$

In some embodiments, the processing engine 112 may determine the first remaining power $P_{free}$ based on the working power $P_0$ and the maximum power $P_{max}$ of the camera 130 according to Equation (7):

$$P_{free} = P_{max} - P_0 \tag{7}$$

In 520, the processing engine 112 (e.g., the processor 220, the judging module 420) may determine whether an operation condition of a first load is satisfied.

In some embodiments, the first load may be a load for different functions of the camera 130. For example, the first load may include a fill flash for providing light for the camera 130, a load for changing a focal length of the camera 130, a load for focusing of the camera 130, or the like, or any combination thereof. In some embodiments, different first loads may require different operation conditions. In some embodiments, the operation condition of the first load may be used to determine whether the camera 130 may restart when enabling the first load. The operation condition of the first load may be predetermined and stored in a storage device (e.g., the storage 140, the ROM 230, the RAM 240, the disk 270, the memory 360, etc.) of the imaging system 100.

In some embodiments, the processing engine 112 may determine whether the operation condition of the first load is satisfied based on the first remaining power. In some embodiments, the processing engine 112 may determine the maximum duty ratio that the first load may use in the circuit of the camera 130 based on the first remaining power. The processing engine 112 may compare the maximum duty ratio with a predetermined duty ratio threshold. The predetermined duty ratio threshold may be a minimum duty ratio that the first load needs when enabling the first load steadily. For example, if the maximum duty ratio that the first load may use in the circuit of the camera 130 exceeds the duty ratio threshold, the processing engine 112 may determine that the operation condition of the first load is satisfied. Exemplary processes for determining whether the operation condition of the first load (e.g., a fill flash) is satisfied may be found elsewhere (e.g., FIG. 7 and the descriptions thereof) in the present disclosure.

In 530, in response to a determination that the operation condition of the first load is satisfied, the processing engine 112 (e.g., the processor 220, the judging module 420) may enable the first load.

In some embodiments, the processing engine 112 may determine that the first load may be enabled under the current circumstance without restarting the camera 130. In some embodiments, the processing engine 112 may enable the first load directly. In some embodiments, the processing engine 112 may send an enabling instruction to the camera 130 (e.g., the processing module 650) to enable the first load. In some embodiments, the processing engine 112 may enable the first load using the minimum duty ratio (i.e., the predetermined duty ratio threshold) that the first load needs when enabling the first load steadily. In some embodiments, the processing engine 112 may further adjust parameters of the first load to make images and/or videos captured by the camera 130 have optimal performances under the current circumstance.

In 540, in response to a determination that the operation condition of the first load is not satisfied, the processing engine 112 (e.g., the processor 220, the judging module 420) may send an alarm and disable the first load.

In some embodiments, the alarm may remind an operator or user of the camera 130 that the camera 130 is working with a low voltage. For example, the alarm may be displayed on a user interface of the camera 130. As another example, the alarm may be sound played to the operator or user of the camera 130.

In some embodiments, the processing engine 112 may determine whether a second load may be enabled after enabling the first load. For example, the processing engine 112 may determine whether an operation condition of the second load is satisfied based on the first remaining power. In some embodiments, the operation condition of the second load may be predetermined and stored in a storage device (e.g., the storage 140, the ROM 230, the RAM 240, the disk 270, the memory 360, etc.) of the imaging system 100. In some embodiments, the process for determining whether to enable the second load may be found elsewhere (e.g., FIG. 11 and the descriptions thereof) in the present disclosure.

Figure 7:
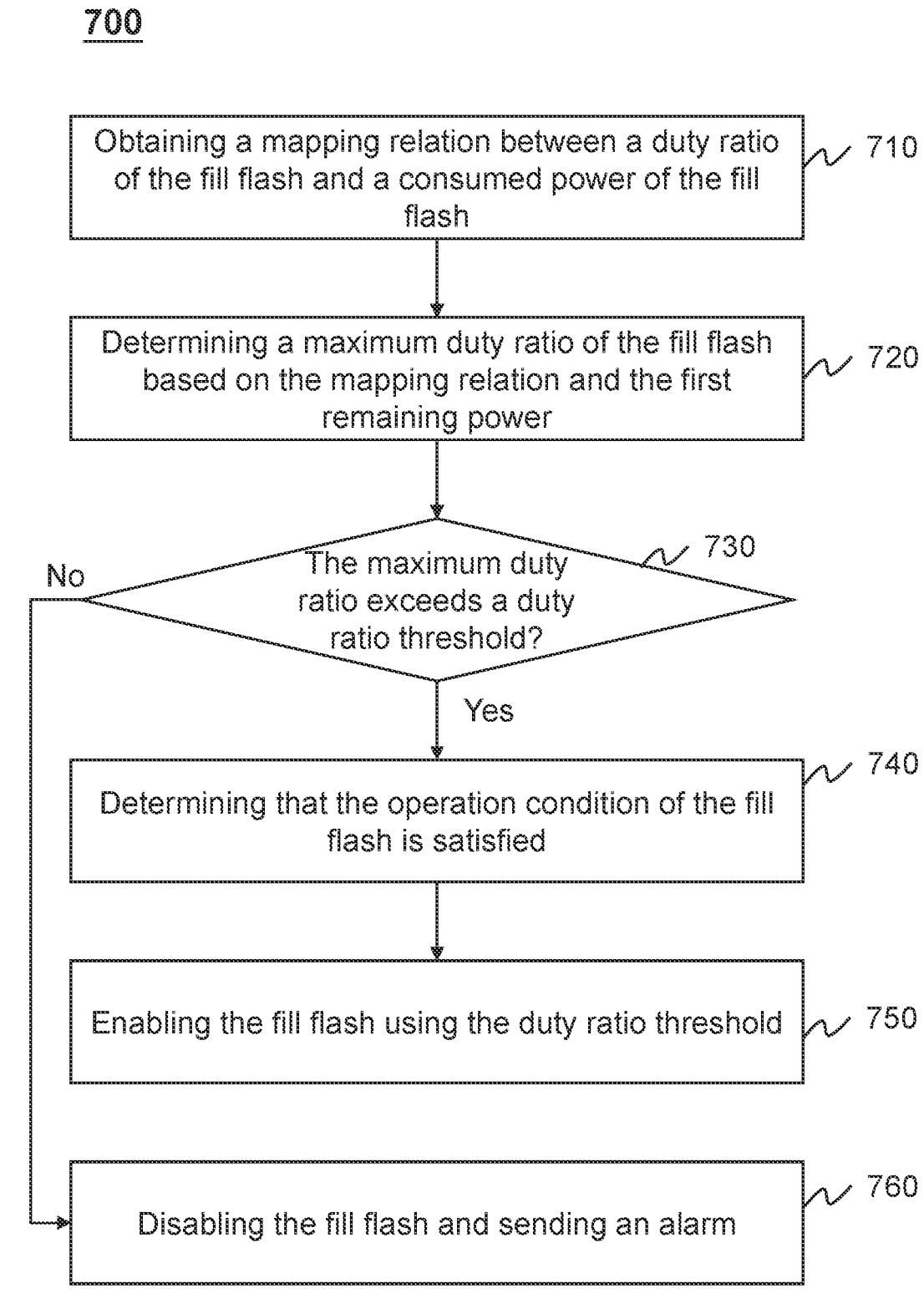
FIG. 7 is a flowchart illustrating an exemplary process for determining whether to enable a fill flash according to some embodiments of the present disclosure.

FIG. 7 is a flowchart illustrating an exemplary process 700 for determining whether to enable a fill flash according to some embodiments of the present disclosure. The process 700 may be executed by the imaging system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the judging module 420) may obtain a mapping relation between a duty ratio of the fill flash and a consumed power of the fill flash.

In some embodiments, the mapping relation may reflect different consumed powers of the fill flash when the fill flash is driven by PWM signals with different duty ratios. In some embodiments, the duty ratio of the fill flash and the consumed power of the fill flash may bear a one-to-one relationship. In some embodiments, the mapping relation may be in a form of a curve chart, a table, an equation, an algorithm, or the like, or any combination thereof. In some embodiments, the mapping relation may be predetermined and stored in a storage device (e.g., the storage 140, the ROM 230, the RAM 240, the disk 270, the memory 360, etc.) of the imaging system 100.

In some embodiments, the mapping relation may be determined based on a plurality of experimental data obtained from a circuit of the camera 130. For example, as shown in FIG. 6, the processing module 650 may output a PWM signal with a duty ratio of $PWM_2$ by adding a step length s from the PWM duty ratio of $PWM_1$. The processing engine 112 may obtain two voltages $V_{i\_2}$ and $V_{in\_2}$ at two ends of the sampling resistance 630 when using the duty ratio of $PWM_2$, respectively. In some embodiments, the processing engine 112 may determine a current $I_2$ of the camera 130 and a current power $P_2$ of the camera 130 according to similar algorithms with Equations (1) and (2). In some embodiments, the processing engine 112 may obtain two voltages $V_{i\_n}$ and $V_{in\_n}$ at two ends of the sampling resistance 630 when using the duty ratio of $PWM_n$, respectively. In some embodiments, the processing engine 112 may determine a current $I_n$ of the camera 130 and a current power $P_n$ of the camera 130 according to similar algorithms with Equations (1) and (2). The duty ratio of $PWM_n$ may be obtained by adding a step length (n−1)s, wherein n>=2.

In some embodiments, a consumed power of the fill flash Pled may be determined according to Equation (8):

$$P_{led} = P_n - P_{(n-1)} \qquad (8).$$

In some embodiments, the processing engine 112 may establish the mapping relation between the duty ratio of the fill flash and the consumed power of the fill flash based on the consumed powers of the fill flash $P_{led}$ under different PWM duty ratio $PWM_n$. For example, the power line 620 is 75 meters and the fill flash is a dual-LED flash with a rated current of 500 mA. Parameters obtained or determined from the circuit as shown in FIG. 6 may be illustrated as TAB. 1.

TABLE 1

| | 75 meters of power line and a dual-LED flash with 500 mA | | |
|---|---|---|---|
| PWM duty ratio | Voltage difference at two end of the fill flash (V) | Current (A) | Consumed power of the fill flash (W) |
| 0.44 | 2.62 | 0.038 | 0.09956 |
| 0.45 | 2.64 | 0.051 | 0.13464 |
| 0.46 | 2.69 | 0.074 | 0.19906 |
| ... | ... | ... | ... |

Figure 8:
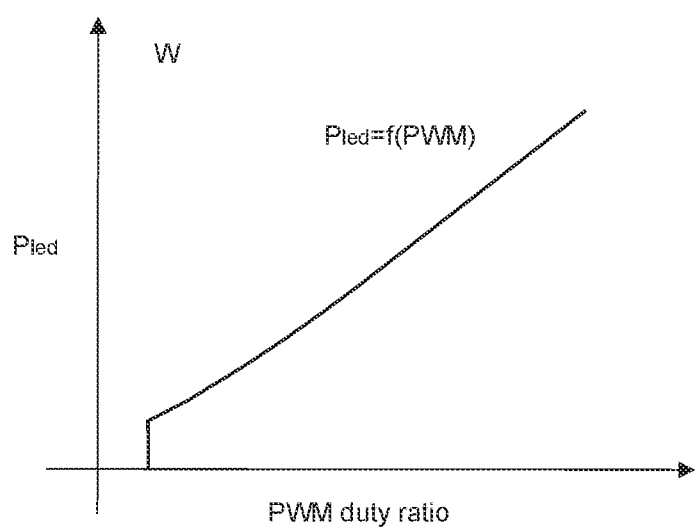
FIG. 8 is a schematic diagram illustrating an exemplary mapping relation between a PWM duty ratio of a fill flash and a consumed power of the fill flash according to some embodiments of the present disclosure.

In some embodiments, the processing engine 112 may establish the mapping relation between the PWM duty ratio and the consumed power of the fill flash according to TAB. 1. For example, the processing engine 112 may determine a fitting formula $P_{led}=f(PWM)$ based on the consumed power of the fill flash under different PWM duty ratio. As another example, the processing engine 112 may determine a fitting curve as shown in FIG. 8 based on the consumed power of the fill flash under different PWM duty ratio. FIG. 8 is a schematic diagram illustrating an exemplary mapping relation between a PWM duty ratio of a fill flash and a consumed power of the fill flash according to some embodiments of the present disclosure.

In 720, the processing engine 112 (e.g., the processor 220, the judging module 420) may determine a maximum duty ratio of the fill flash based on the mapping relation and the first remaining power.

In some embodiments, the maximum duty ratio of the fill flash may be a maximum duty ratio that the fill flash may use under the current circumstance. In some embodiments, the processing engine 112 may input the first remaining power that represents the maximum power that the fill flash may use in the current circumstance into the fitting formula $P_{led}=f(PWM)$ to obtain the maximum duty ratio of the fill flash. In some embodiments, the processing engine 112 may look up the power value of the first remaining power in FIG. 8, and determine a duty ratio under the power value of the first remaining power as the maximum duty ratio of the fill flash.

In 730, the processing engine 112 (e.g., the processor 220, the judging module 420) may determine whether the maximum duty ratio exceeds a duty ratio threshold.

In some embodiments, the duty ratio threshold may be a minimum duty ratio that the fill flash needs when enabling the fill flash steadily. In some embodiments, the duty ratio threshold may be predetermined and stored in a storage device (e.g., the storage 140, the ROM 230, the RAM 240, the disk 270, the memory 360, etc.) of the imaging system 100.

In 740, in response to a determination that the maximum duty ratio exceeds the duty ratio threshold, the processing engine 112 (e.g., the processor 220, the judging module 420) may determine that the operation condition of the first load is satisfied.

In some embodiments, in response to the determination that the maximum duty ratio exceeds the duty ratio threshold, the processing engine 112 may determine that the fill flash may be enabled without restarting the camera 130.

In 750, the processing engine 112 (e.g., the processor 220, the judging module 420) may enable the fill flash using the duty ratio threshold.

In some embodiments, to prevent the fill flash from flickering, the processing engine 112 may enable the fill flash using the minimum duty ratio that the fill flash needs when enabling the fill flash steadily (i.e., the duty ratio threshold).

Referring back to 730, in response to a determination that the maximum duty ratio is less than the duty ratio threshold, in 760, the processing engine 112 (e.g., the processor 220, the judging module 420) may disable the fill flash and send an alarm.

In some embodiments, in response to a determination that the maximum duty ratio is less than the duty ratio threshold, the processing engine 112 may determine that the operation condition of the fill flash is not satisfied. If the fill flash is enabled, the camera 130 may be restarted. The processing engine 112 may not enable the fill flash and may send an alarm to remind the operator or the user of the camera 130 that the voltage of the camera is low.

Figure 9:
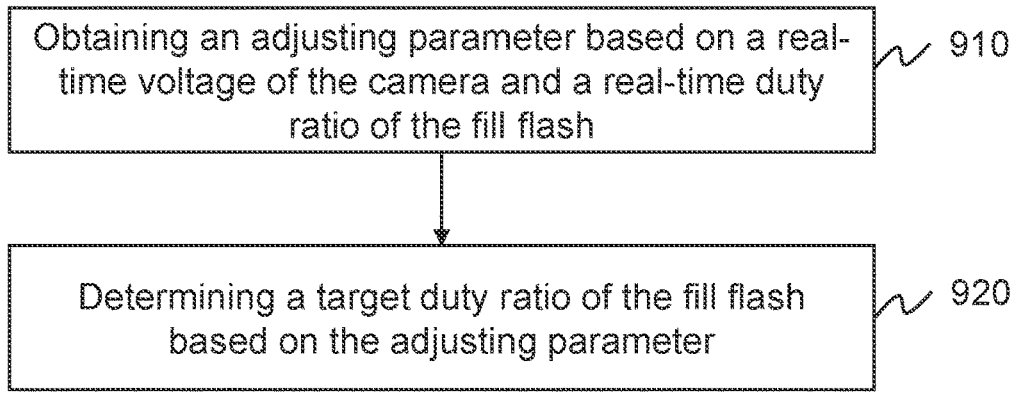
FIG. 9 is a flowchart illustrating an exemplary process for determining a target duty ratio of a fill flash according to some embodiments of the present disclosure.

FIG. 9 is a flowchart illustrating an exemplary process 900 for determining a target duty ratio of a fill flash according to some embodiments of the present disclosure. The process 900 may be executed by the imaging system 100. For example, the process 900 may be implemented as a set of instructions (e.g., an application) stored in the storage ROM 230 or the RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In some embodiments, after enabling the fill flash using the minimum duty ratio that the fill flash needs when enabling the fill flash steadily (i.e., the duty ratio threshold), the processing engine 112 may proceed with the process 900 to adjust the fill flash to achieve an optimal luminance of a scene that the camera 130 monitors. In some embodiments, during an operation of the fill flash and the camera 130, the voltage of the camera may be variable. The processing engine 112 may proceed with the process 900 to adjust the fill flash in real-time.

In 910, the processing engine 112 (e.g., the processor 220, the judging module 420) may obtain an adjusting parameter based on a real-time voltage of the camera 130 and a real-time duty ratio of the fill flash.

In some embodiments, the adjusting parameter may reflect a real-time operating environment of the camera 130 and the fill flash. The adjusting parameter may be used to determine whether the fill flash is an optimal working condition under the current circumstance. In some embodiments, the adjusting parameter may be determined based on the real-time voltage $V_{in}$ of the camera 130 to the real-time duty ratio $PWM_{cru}$ of the fill flash according to a predetermined algorithm. For example, the adjusting parameter may be a ratio of the real-time voltage $V_{in}$ of the camera 130 to the real-time duty ratio $PWM_{cru}$ of the fill flash.

In 920, the processing engine 112 (e.g., the processor 220, the judging module 420) may determine a target duty ratio of the fill flash based on the adjusting parameter.

In some embodiments, using the target duty ratio, the fill flash may provide an optimal luminance of the scene that the camera 130 monitors under the current circumstance. In some embodiments, the processing engine 112 may determine the target duty ratio based on the adjusting parameter. For example, the processing engine 112 may determine a step length that the current PWM duty ratio may increase or decrease under the current circumstance of the adjusting parameter. The processing engine 112 may add the step length to the real-time duty ratio of the fill flash or subtract the step length from the real-time duty ratio of the fill flash to obtain the target duty ratio of the fill flash. As another example, the processing engine 112 may determine that the fill flash does not need to be adjusted. The processing engine 112 may assign the real-time duty ratio of the fill flash as the target duty ratio. In some embodiments, the process for determining the step length for adjusting the fill flash may be found elsewhere (e.g., FIG. 10 and the descriptions thereof) in the present disclosure.

Figure 10:
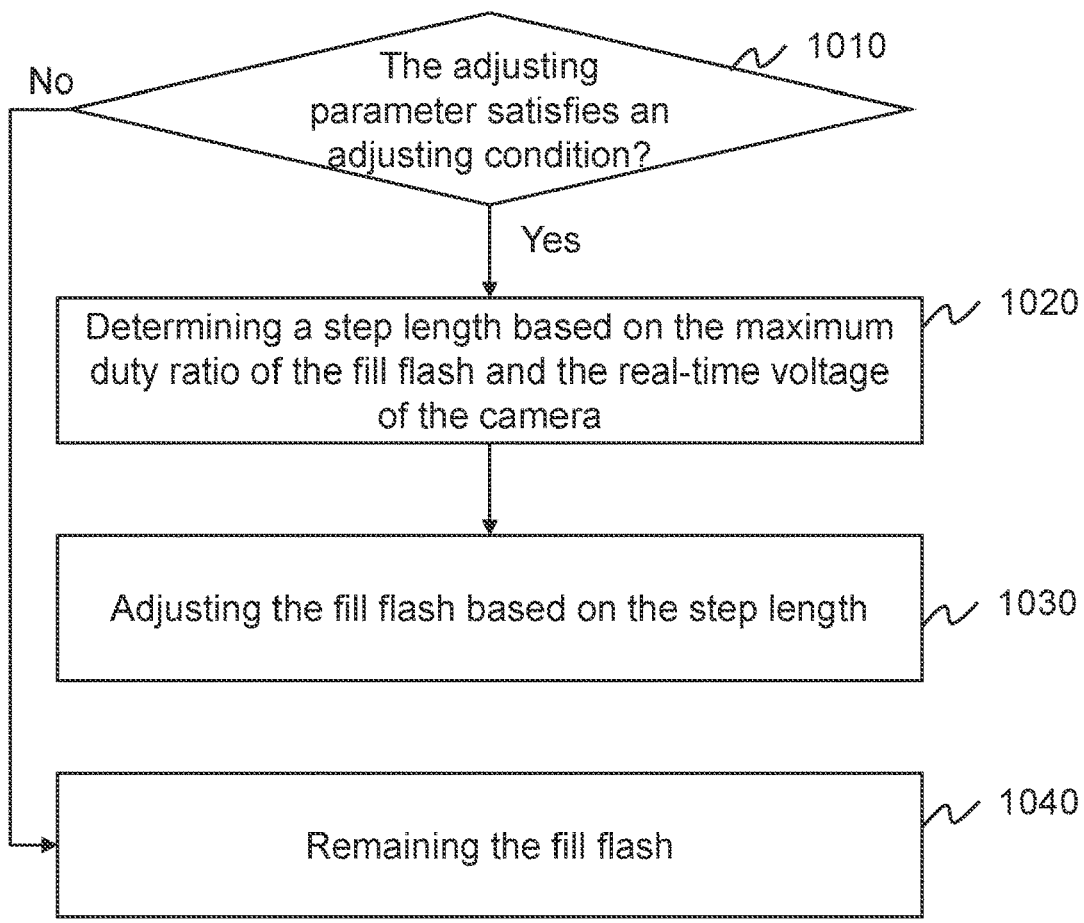
FIG. 10 is a flowchart illustrating an exemplary process for determining a step length for adjusting a fill flash according to some embodiments of the present disclosure.

FIG. 10 is a flowchart illustrating an exemplary process for determining a step length for adjusting a fill flash according to some embodiments of the present disclosure. The process 1000 may be executed by the imaging system 100. For example, the process 1000 may be implemented as a set of instructions (e.g., an application) stored in the storage ROM 230 or the RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the judging module 420) may determine whether the adjusting parameter satisfies an adjusting condition.

In some embodiments, the adjusting condition may be used to determine whether the fill flash provides the optimal luminance for the camera 130 under the current circumstance. In some embodiments, the adjusting condition may be predetermined and stored in a storage device (e.g., the storage 140, the ROM 230, the RAM 240, the disk 270, the memory 360, etc.) of the imaging system 100. For example, the adjusting condition may include determining whether the adjusting parameter exceeds a first threshold and/or a second threshold.

In some embodiments, the processing engine 112 may determine whether the adjusting parameter exceeds the first threshold. For example, the processing engine 112 may determine whether the ratio of the real-time voltage $V_{in}$ of the camera 130 to the real-time duty ratio $PWM_{cru}$ of the fill flash, $V_{in}/PWM_{cru}$, exceeds the first threshold $PWM_{down\text{-}thr}$. If the ratio $V_{in}/PWM_{cru}$ is less than the first threshold $PWM_{down\text{-}thr}$, the processing engine 112 may determine that the real-time voltage $V_{in}$ of the fill flash may be less than the voltage protection point $V_{min}$ that supports the camera 130 to operate normally, which may lead to the restart of the camera 130. The processing engine 112 may decrease the real-time duty ratio $PWM_{cru}$ of the fill flash to increase the real-time voltage $V_{in}$ of the camera 130 to prevent the camera 130 from restarting. As another example, the processing engine 112 may determine whether the ratio of the real-time voltage $V_{in}$ of the camera 130 to the real-time duty ratio $PWM_{cru}$ of the fill flash, $V_{in}/PWM_{cru}$, exceeds the second threshold $PWM_{up\text{-}thr}$. If the ratio $V_{in}/PWM_{cru}$ exceeds the second threshold $PWM_{up\text{-}thr}$, the processing engine 112 may determine that the real-time voltage $V_{in}$ of the fill flash may be great enough to increase the real-time duty ratio $PWM_{cru}$ of the fill flash to increase the luminance that the fill flash provides. The processing engine 112 may increase the real-time duty ratio $PWM_{cru}$ of the fill flash to achieve an optimal luminance effect. As still another example, if the ratio $V_{in}/PWM_{cru}$ exceeds the first threshold $PWM_{down\text{-}thr}$ and is less than the second threshold $PWM_{up\text{-}thr}$, the processing engine 112 may determine that the real-time voltage $V_{in}$ of the camera 130 and the real-time duty ratio $PWM_{cru}$ of the fill flash may be under steady states. The processing engine 112 may not adjust the luminance that the fill flash provides.

In 1020, in response to a determination that the adjusting parameter satisfies the adjusting condition, the processing engine 112 (e.g., the processor 220, the judging module 420) may determine a step length based on the maximum duty ratio of the fill flash and the real-time voltage of the camera.

In some embodiments, the step length may be proportional to the maximum duty ratio of the fill flash and the real-time voltage of the camera. For example, the processing engine 112 may determine the step length according to Equation (9):

$$PWM_{step}=V_{diff}*PWM_{initMax}*A+B \qquad (9),$$

wherein $PWM_{step}$ denotes the step length, $V_{diff}$ denotes a difference between the real-time voltage $V_{in}$ of the camera 130 and the voltage protection point $V_{min}$, $PWM_{initMax}$ denotes a maximum duty ratio that the fill flash may use when enabling the fill flash, and A and B denote predetermined coefficients.

In 1030, the processing engine 112 (e.g., the processor 220, the judging module 420) may adjust the fill flash based on the step length.

In some embodiments, if the processing engine 112 determines to decrease the real-time duty ratio $PWM_{cru}$ of the fill flash, the processing engine 112 may subtract the step length from the real-time duty ratio $PWM_{cru}$ of the fill flash. In some embodiments, if the processing engine 112 determines to increase the real-time duty ratio $PWM_{cru}$ of the fill flash, the processing engine 112 may add the step length to the real-time duty ratio $PWM_{cru}$ of the fill flash.

In 1040, in response to a determination that the adjusting parameter does not satisfy the adjusting condition, the processing engine 112 (e.g., the processor 220, the judging module 420) may remain the fill flash.

In some embodiments, if the ratio $V_{in}/PWM_{cru}$ exceeds the first threshold $PWM_{down\text{-}thr}$ and is less than the second threshold $PWM_{up\text{-}thr}$, the processing engine 112 may determine that the adjusting parameter does not satisfy the adjusting condition. The processing engine 112 may remain the fill flash without adjusting the current parameters of the fill flash.

In some embodiments, the processing engine 112 may further determine whether a luminance that the fill flash provides for the camera 130 to capture videos or images exceeds a predetermined target luminance threshold. If the luminance is less than the predetermined target luminance threshold, the processing engine 112 may loop operations 1010-1040 until the luminance exceeds the predetermined target luminance threshold. In some embodiments, the step length that used for adjusting the fill flash may be determined dynamically and may solve problems of large fluctuation due to a low voltage of a long power line.

Figure 11:
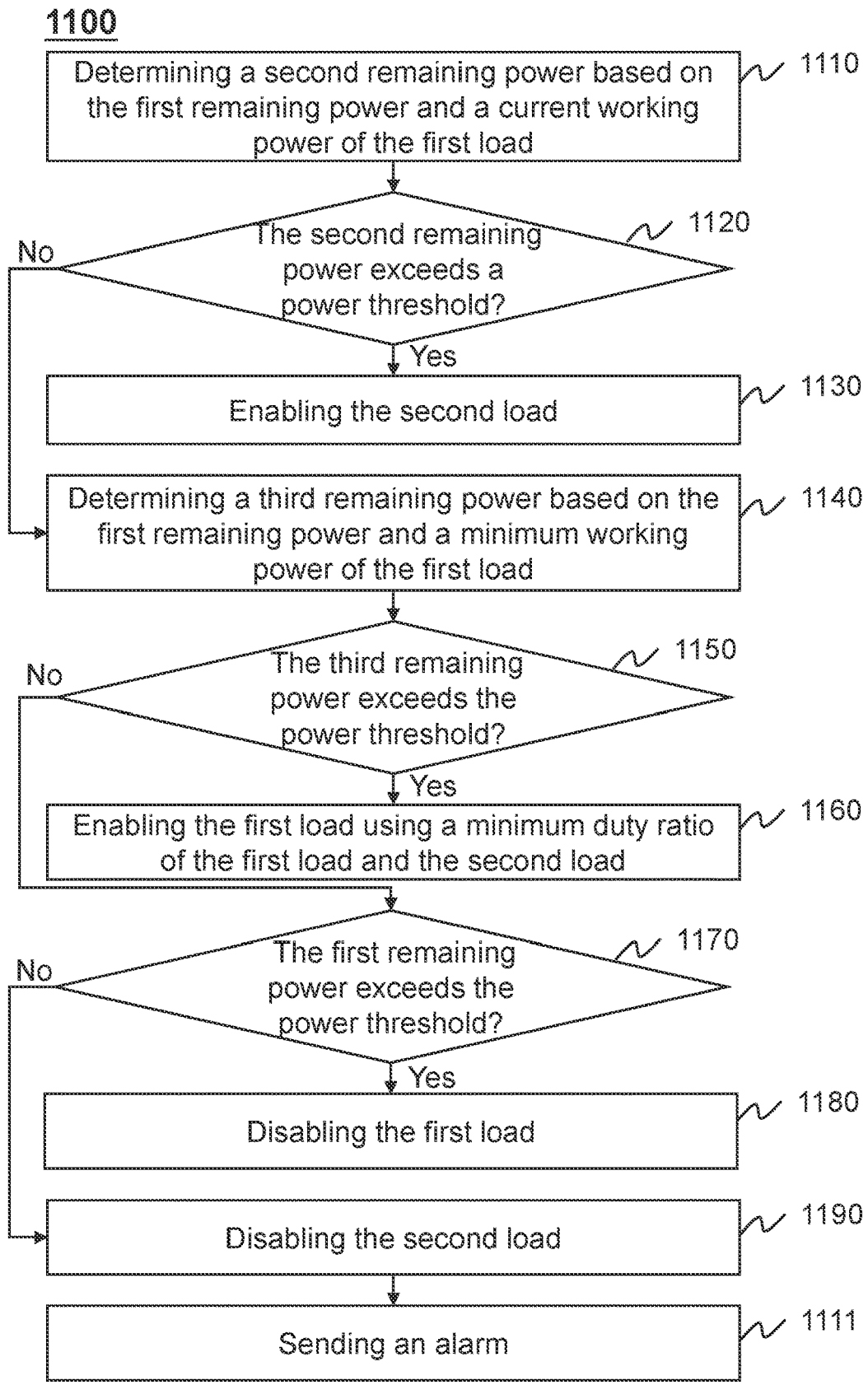
FIG. 11 is a flowchart illustrating an exemplary process for determining whether to enable a second load according to some embodiments of the present disclosure.

FIG. 11 is a flowchart illustrating an exemplary process for determining whether to enable a second load according to some embodiments of the present disclosure. The process 1100 may be executed by the imaging system 100. For example, the process 1100 may be implemented as a set of instructions (e.g., an application) stored in the storage ROM 230 or the RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processing engine 112 (e.g., the processor 220, the judging module 420) may determine a second remaining power based on the first remaining power and a current working power of the first load.

In some embodiments, the second remaining power may be a remaining power after subtracting the current working power $P_{led}$ of the first load from the first remaining power $P_{free}$.

In 1120, the processing engine 112 (e.g., the processor 220, the judging module 420) may determine whether the second remaining power exceeds a power threshold.

In some embodiments, the power threshold may be a minimum power that the second load needs when enabling the second load. In some embodiments, the power threshold may be stored in a storage device (e.g., the storage 140, the ROM 230, the RAM 240, the disk 270, the memory 360, etc.) of the imaging system 100 or determined based on the second load.

In 1130, in response to a determination that the second remaining power exceeds the power threshold, the processing engine 112 (e.g., the processor 220, the judging module 420) may enable the second load.

In some embodiments, in response to the determination that the second remaining power exceeds the power threshold, the processing engine 112 may determine that the second remaining power is enough for enabling the second load without changing the current parameters of the first load and the camera 130.

In 1140, in response to a determination that the second remaining power is less than the power threshold, the processing engine 112 (e.g., the processor 220, the judging module 420) may determine a third remaining power based on the first remaining power and a minimum working power of the first load.

In some embodiments, in response to the determination that the second remaining power is less than the power threshold, the processing engine 112 may determine that the second remaining power is not enough for enabling the second load and the camera 130 may be restarted if enabling the second load. The processing engine 112 may further determine whether the second load may be enabled after adjusting the first load using the duty ratio threshold. In some embodiments, the processing engine 112 may determine the minimum working power of the first load when the first load is working using the duty ratio threshold. The third remaining power may be a remaining power after subtracting the minimum working power $P_{led\_min}$ of the first load from the first remaining power $P_{free}$.

In 1150, the processing engine 112 (e.g., the processor 220, the judging module 420) may determine whether the third remaining power exceeds the power threshold.

In 1160, in response to a determination that the third remaining power exceeds the power threshold, the processing engine 112 (e.g., the processor 220, the judging module 420) may enable the first load using a minimum duty ratio of the first load and the second load.

In some embodiments, in response to the determination that the third remaining power exceeds the power threshold, the processing engine 112 may determine that the third remaining power is enough for enabling the second load without restarting the camera 130. The processing engine 112 may enable the first load using the minimum duty ratio (i.e., the duty ratio threshold) of the first load and enable the second load. In some embodiments, the processing engine 112 may further send an alarm for prompting a low voltage of the camera 130.

In 1170, in response to a determination that the third remaining power is less than the power threshold, the processing engine 112 (e.g., the processor 220, the judging module 420) may determine whether the first remaining power exceeds the power threshold.

In some embodiments, in response to the determination that the third remaining power is less than the power threshold, the processing engine 112 may determine that the third remaining power is not enough for enabling the second load and the camera 130 may be restarted if enabling the second load. The processing engine 112 may further determine whether the second load may be enabled after disabling the first load.

In 1180, in response to a determination that the first remaining power exceeds the power threshold, the processing engine 112 (e.g., the processor 220, the judging module 420) may disable the first load.

In some embodiments, in response to the determination that the first remaining power exceeds the power threshold, the processing engine 112 may determine that the first remaining power is enough for enabling the second load without restarting the camera 130. The processing engine 112 may disable the first load and enable the second load. In some embodiments, the processing engine 112 may further send an alarm for prompting a low voltage of the camera 130.

In 1190, in response to a determination that the first remaining power is less than the power threshold, the processing engine 112 (e.g., the processor 220, the judging module 420) may disable the second load.

In some embodiments, in response to the determination that the first remaining power is less than the power threshold, the processing engine 112 may determine that the first remaining power is not enough for enabling the second load and the camera 130 may be restarted if enabling the first load. The processing engine 112 may disable the second load.

In 1111, the processing engine 112 (e.g., the processor 220, the judging module 420) may send an alarm. In some embodiments, the processing engine 112 may send the alarm for prompting a low voltage of the camera 130.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or orders, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An imaging system, comprising:
   at least one storage medium including a set of instructions; and
   at least one processor in communication with the storage medium, wherein when executing the set of instructions, the at least one processor is directed to perform operations including:
      determining a first remaining power based on a maximum power of a camera and a working power of the camera;
      determining whether an operation condition of a first load is satisfied based on the first remaining power, wherein the first load is a fill flash and the determining whether the operation condition of the first load is satisfied includes:
         obtaining a mapping relation between a duty ratio of the fill flash and a consumed power of the fill flash;
         determining a maximum duty ratio of the fill flash based on the mapping relation and the first remaining power;
         determining whether the maximum duty ratio of the fill flash exceeds a duty ratio threshold; and
         in response to a determination that the maximum duty ratio exceeds the duty ratio threshold, determining that the operation condition of the first load is satisfied; and
      in response to a determination that the operation condition of the first load is satisfied, enabling the first load.

2. The imaging system of claim 1, wherein the enabling the first load includes:
   enabling the fill flash using the duty ratio threshold.

3. The imaging system of claim 2, wherein the operations further include:
   determining an adjusting parameter based on a real-time voltage of the camera and a real-time duty ratio of the fill flash; and
   determining a target duty ratio of the fill flash based on the adjusting parameter.

4. The imaging system of claim 3, wherein the determining the target duty ratio of the fill flash includes:
   determining whether the adjusting parameter satisfies an adjusting condition; and
   in response to a determination that the adjusting parameter satisfies the adjusting condition, determining a step length based on the maximum duty ratio of the fill flash and the real-time voltage of the camera.

5. The imaging system of claim 1, wherein the operations further include:
   determining whether an operation condition of a second load is satisfied based on the first remaining power.

6. The imaging system of claim 5, wherein the determining whether the operation condition of the second load is satisfied includes:
   determining a second remaining power based on the first remaining power and a current working power of the first load;
   determining whether the second remaining power exceeds a power threshold; and
   in response to a determination that the second remaining power exceeds the power threshold, enabling the second load.

7. The imaging system of claim 6, wherein the operations further include:
   in response to a determination that the second remaining power is less than the power threshold, determining a third remaining power based on the first remaining power and a minimum working power of the first load;
   determining whether the third remaining power exceeds the power threshold;
   in response to a determination that the third remaining power exceeds the power threshold, enabling the first load using a minimum duty ratio of the first load; and
   enabling the second load.

8. The imaging system of claim 7, wherein the operations further include:
   in response to a determination that the third remaining power is less than the power threshold, determining whether the first remaining power exceeds the power threshold; and
   in response to a determination that the first remaining power exceeds the power threshold, disabling the first load.

9. The imaging system of claim 8, wherein the operations further include:
   in response to a determination that the first remaining power is less than the power threshold, disabling the second load and sending an alarm.

10. The imaging system of claim 1, wherein the obtaining the mapping relation includes:
    determining a consumed power of the fill flash under each duty ratio of a plurality of duty ratios; and
    establishing the mapping relation based on the consumed power under each duty ratio of a plurality of duty ratios.

11. An imaging method, comprising:
    determining a first remaining power based on a maximum power of a camera and a working power of the camera;
    determining whether an operation condition of a first load is satisfied based on the first remaining power, wherein the first load is a fill flash and the determining whether the operation condition of the first load is satisfied includes:
       obtaining a mapping relation between a duty ratio of the fill flash and a consumed power of the fill flash;
       determining a maximum duty ratio of the fill flash based on the mapping relation and the first remaining power;
       determining whether the maximum duty ratio of the fill flash exceeds a duty ratio threshold; and
       in response to a determination that the maximum duty ratio exceeds the duty ratio threshold, determining that the operation condition of the first load is satisfied; and
    in response to a determination that the operation condition of the first load is satisfied, enabling the first load.

12. The imaging method of claim 11, wherein the enabling the first load includes:
    enabling the fill flash using the duty ratio threshold.

13. The imaging method of claim 12, further comprising:
    determining an adjusting parameter based on a real-time voltage of the camera and a real-time duty ratio of the fill flash; and
    determining a target duty ratio of the fill flash based on the adjusting parameter.

14. The imaging method of claim 11, further comprising:
    determining whether an operation condition of a second load is satisfied based on the first remaining power.

15. The imaging method of claim 14, wherein the determining whether the operation condition of the second load is satisfied includes:
    determining a second remaining power based on the first remaining power and a current working power of the first load;

determining whether the second remaining power exceeds a power threshold; and in response to a determination that the second remaining power exceeds the power threshold, enabling the second load.

16. The imaging method of claim 15, further comprising:

in response to a determination that the second remaining power is less than the power threshold, determining a third remaining power based on the first remaining power and a minimum working power of the first load;

determining whether the third remaining power exceeds the power threshold;

in response to a determination that the third remaining power exceeds the power threshold, enabling the first load using a minimum duty ratio of the first load; and enabling the second load.

17. The imaging method of claim 11, wherein the obtaining the mapping relation includes:

determining a consumed power of the fill flash under each duty ratio of a plurality of duty ratios; and establishing the mapping relation based on the consumed power under each duty ratio of a plurality of duty ratios.

18. A non-transitory readable medium, comprising at least one set of instructions, wherein when executed by at least one processor of an electrical device, the at least one set of instructions directs the at least one processor to perform operations including:

determining a first remaining power based on a maximum power of a camera and a working power of the camera;

determining whether an operation condition of a first load is satisfied based on the first remaining power, wherein the first load is a fill flash and the determining whether the operation condition of the first load is satisfied includes:

obtaining a mapping relation between a duty ratio of the fill flash and a consumed power of the fill flash;

determining a maximum duty ratio of the fill flash based on the mapping relation and the first remaining power;

determining whether the maximum duty ratio of the fill flash exceeds a duty ratio threshold; and in response to a determination that the maximum duty ratio exceeds the duty ratio threshold, determining that the operation condition of the first load is satisfied; and in response to a determination that the operation condition of the first load is satisfied, enabling the first load.

19. The non-transitory readable medium of claim 18, wherein the enabling the first load includes:

enabling the fill flash using the duty ratio threshold.

20. The non-transitory readable medium of claim 19, further comprising:

determining an adjusting parameter based on a real-time voltage of the camera and a real-time duty ratio of the fill flash; and determining a target duty ratio of the fill flash based on the adjusting parameter.

* * * * *